(12) United States Patent
Struve

(10) Patent No.: US 6,390,168 B1
(45) Date of Patent: May 21, 2002

(54) HEATING TOOL FOR WELDING THERMOPLASTIC SHEETS

(76) Inventor: Friedrich Struve, 3310 Maple Park Dr., Kingwood, TX (US) 77339

( * ) Notice: Subject to any disclaimer, the term of this patent is extended or adjusted under 35 U.S.C. 154(b) by 0 days.

(21) Appl. No.: 09/569,267

(22) Filed: May 11, 2000

(51) Int. Cl.[7] ................................................ B32B 31/08
(52) U.S. Cl. ..................... 156/499; 156/544; 156/583.4
(58) Field of Search ................................. 156/391, 499, 156/544, 553, 555, 580, 581, 582, 583.1, 583.4

(56) References Cited

U.S. PATENT DOCUMENTS

| | | | | |
|---|---|---|---|---|
| 4,146,419 A | * | 3/1979 | Neidhart ..................... | 156/391 |
| 4,655,872 A | * | 4/1987 | Neumuller et al. .......... | 156/499 |
| 4,769,102 A | * | 9/1988 | Neumuller et al. .......... | 156/359 |
| 5,051,148 A | * | 9/1991 | Resch .......................... | 156/358 |
| 5,490,626 A | * | 2/1996 | Kaminski ................... | 228/44.3 |
| 5,897,721 A | * | 4/1999 | Kriofske et al. ............. | 156/70 |
| 6,050,317 A | * | 4/2000 | Weissfloch .................. | 156/499 |
| 6,153,033 A | * | 11/2000 | Kriefske et al. ............. | 156/70 |
| 6,186,210 B1 | * | 2/2001 | Gehde ......................... | 156/499 |

OTHER PUBLICATIONS

Kolbasuk, Gary M., (1990) "Hot Wedge Fusion Welding of HDPE Geomembranes", The Seaming of Geosynthetics Elsevier Applied Science 1990 ISBN 1–85166–483–1 pp. 25 through 37 USA.

Struve, F. (1993) "Consistent Wedge Welders" Geosynthetic Liner Systems: Innovations, Concerns & Designs Industrial FabricsAssn Intnl ISBN 0–935803–01–7 pp. 9 through 23 USA.

Rollin, A.L. et al (1998) "The Influence of the Welding Parameters for HDPE Geomembranes" Procedings of the 6th Intl Conference on Geosynthetics, Atlanta, Mar. 1998 pages.

* cited by examiner

Primary Examiner—James Sells

(57) ABSTRACT

The invention provides for improved welding of thermoplastic sheets by selectively reducing and optimizing the temperature gradient from the edge of the weld to the unheated body of the sheet by adding heating-surface-area, beyond that required to achieve a weld, to a heating tool for the purpose of raising the temperature of the material adjacent to and along the edge of the weld, in a controlled manner.

1 Claim, 4 Drawing Sheets

HEATING TOOL FOR WELDING THERMOPLASTIC SHEETS

BACKGROUND OF THE INVENTION

1. Field of the Invention

The present invention generally relates to an improved heated tool, usually wedge shaped, for use in welding machines used to join thermoplastic sheets together. More particularly, the invention relates to a heated tool which is designed to advantageously condition the sheet material adjacent to and along the edge of the actual weld.

2. Description of the Prior Art

The welding together of overlapped thermoplastic sheets by heating the upper surface of the lower sheet and the lower surface of the upper (overlapping) sheet, above their melting point, and then applying pressure so that the two melted surfaces join and fuse into a weld is a well established and documented practice. One of the earliest patents in the U.S. is U.S. Pat. No. 4,146,419, Inventor Wolfgang Neidhart, in which many features of currently used welding machines are described. This type of welding machine is widely used in the pollution control industry which lines landfills and other waste containment facilities with chemically resistant and durable thermoplastic sheet liners known as geomembranes.

The most widely used method of heating the surfaces of the sheets to be welded is by dragging a heated block of metal between the overlapped sheets. This block is usually heated by imbedded electrical resistance heaters, but can be heated by induction heating. This block is usually made in the form of a wedge, the wedge tapering to its thin end just ahead of the device which squeezes the two sheets together, usually by means of a set of opposing pinch rollers. It is common to produce two parallel weld tracks to facilitate air pressure testing of the weld seam.

The heating can also be achieved by a jet of hot air (or gas) being blown through a nozzle inserted between the overlapped sheets. This method is less favored because the low specific heat of air and the impracticality of blowing high volumes of air, means the only way of providing sufficient energy to melt the sheet surfaces is to raise the temperature of the air to a level which is damaging to the thermoplastic molecules, causing unwanted degradation.

Detailed descriptions of so called Hot Wedge welding can be found in: "Hot Wedge Fusion Welding of HDPE Geomembranes" by Gary M Kolbasuk Published in "The Seaming Of Geosynthetics" edited by R. M. Koerner, published by Elsevier Applied Science ISBN 1 85166 4831 and; "Consistent Wedge Welder" by Fred Struve in "Geosynthetic Liner Systems: Innovations, Concerns, and Design" Published by Industrial Fabrics Association International ISBN 0 935803 01 7.

Until the present the welding parameters of concern have been the temperature of the heated wedge, the speed of welding, the force between the pinch rolls, and in addition the question of using a radiused shape for the heating surface, as opposed to a flat shape has been considered.

Long term durability tests of the welds have consistently shown that failures, especially of the low load stress crack growth type, occur at or very near to, the edges of the welds. One of the issues of concern which has been raised is the fact that the surface of the sheet which is dragged over, and is in intimate contact with, the heated surface of the wedge is subject to relatively high temperatures whereas the sheet immediately adjacent to it, only a few thousandth of an inch away, is only subject to ambient temperature. This severe temperature gradient at the edge of the weld is likely to cause significant morphological differences along the edge of a weld, which contribute to this being a locus of weakness. This subject is investigated and discussed in "The Influence of the Welding Parameters for HDPE Geomembranes" by A. L. Rollin et al in a paper presented at the 6$^{th}$ International Conference on Geosynthetics, Atlanta, March, 1998.

SUMMARY OF THE INVENTION

In a primary embodiment, the invention provides for an improved heated wedge, which is wider, for some distance along its length, than the width of the desired weld track. If the length of the wedge in the direction of the weld track is considered to be 100%, then by increasing the width of the wedge over say 50% of its length, the sheet on either side of where the weld track will be, is subjected to heating by the wedge for half the time that the actual weld area is subjected to heating by the wedge. The temperature gradient at the edge of the weld track is thereby reduced. The amount of additional width and percentage of the wedge length chosen for "tapering" the amount of heat supplied to the sheet along the edge of the weld track is variable and subject to design and testing for best results.

BRIEF DESCRIPTION OF THE DRAWINGS

Further details of the invention are explained below with the help of the examples illustrated in the attached drawings in which.

DETAILED DESCRIPTION OF THE PREFERRED EMBODIMENTS

Figure 1:
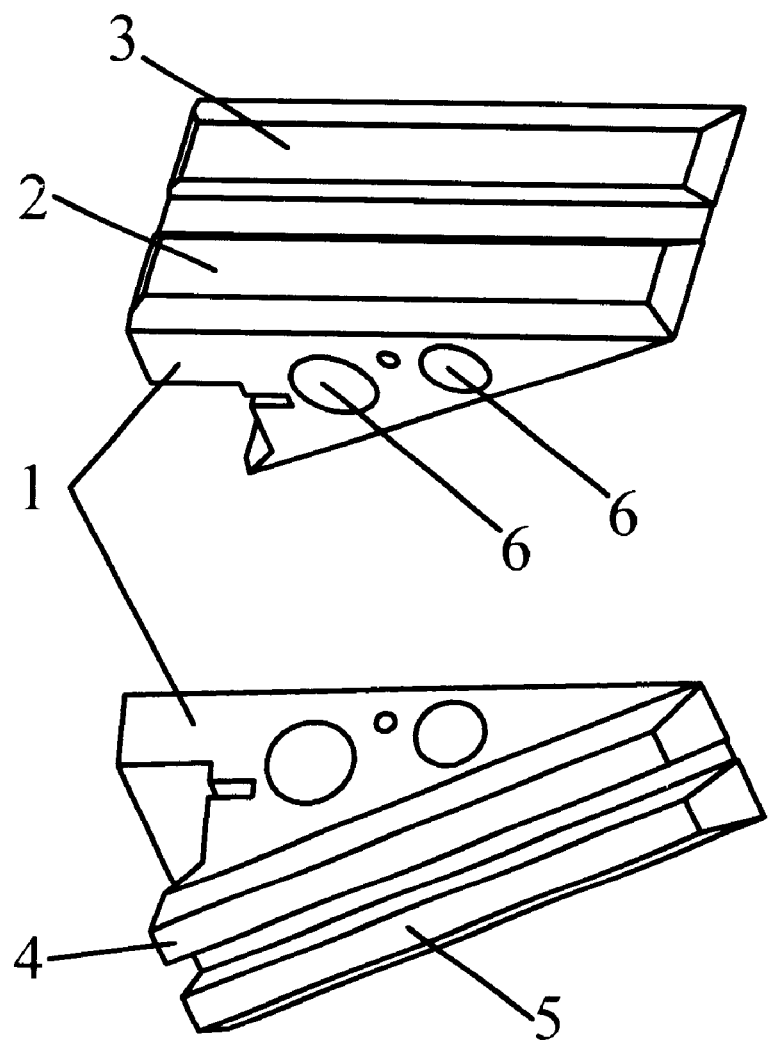
FIG. 1 depicts two views of a typical prior art dual track heated wedge used for welding sheets of thermoplastic material.

FIG. 1 shows a typical heated wedge 1 with flat heating surfaces for dual track welding of thermoplastic sheets. Cartridge type electric resistance heaters 6 heat wedge 1 in known manner. Items 2 and 3 are the heating-tracks on the top of the wedge 1, and items 4 and 5 are the heating-tracks on the underside of the wedge 1.

Figure 2:
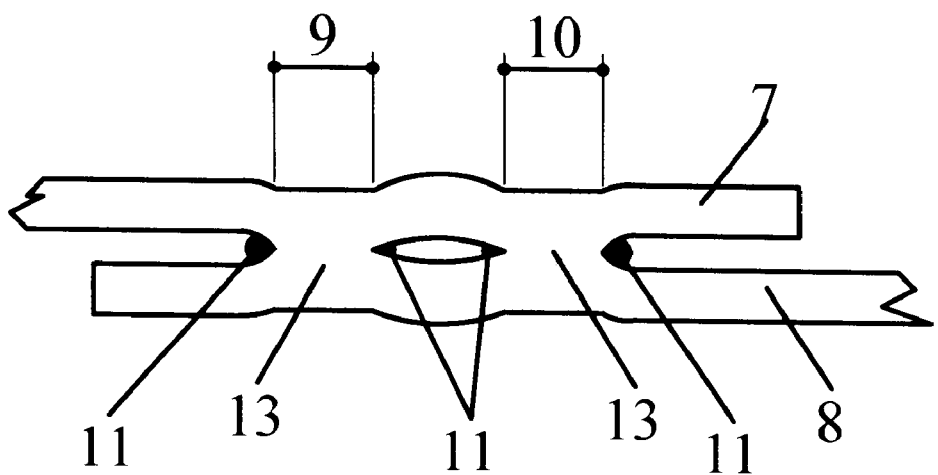
FIG. 2 depicts two sheets welded together using the heated wedge shown in FIG. 1.

FIG. 2 shows the cross-section of the weld-tracks created by the use of wedge 1, in FIG. 1. Item 7 is the upper sheet, which has been, welded to item 8 the lower sheet. The weld-track widths are shown as items 9 and 10. Items marked 11 are the beads of material squeezed out of the weld when the two sheet surfaces are pressed together after heating. The width of the weld-tracks 9 and 10 are the same as the widths of the heat-tracks 2 and 3 respectively, on wedge 1. The result is that the sheet material in the shaded areas marked 13 has been subjected to the high temperature of the heated wedge. The sheet material directly on either side of the weld-tracks has never been in contact with the heated wedge. This means that across a very short distance the sheet material has been subjected to an extremely high temperature gradient from ambient temperature of say 20/40 degrees Celsius to heated wedge surface temperature of say 350/400 degrees Celsius. This large change of temperature over such a short distance causes morphological changes in the macro-molecular and crystalline structure of the material along the edge of the weld-tracks leading to stress concentrations and susceptibility to premature failure.

Figure 3:
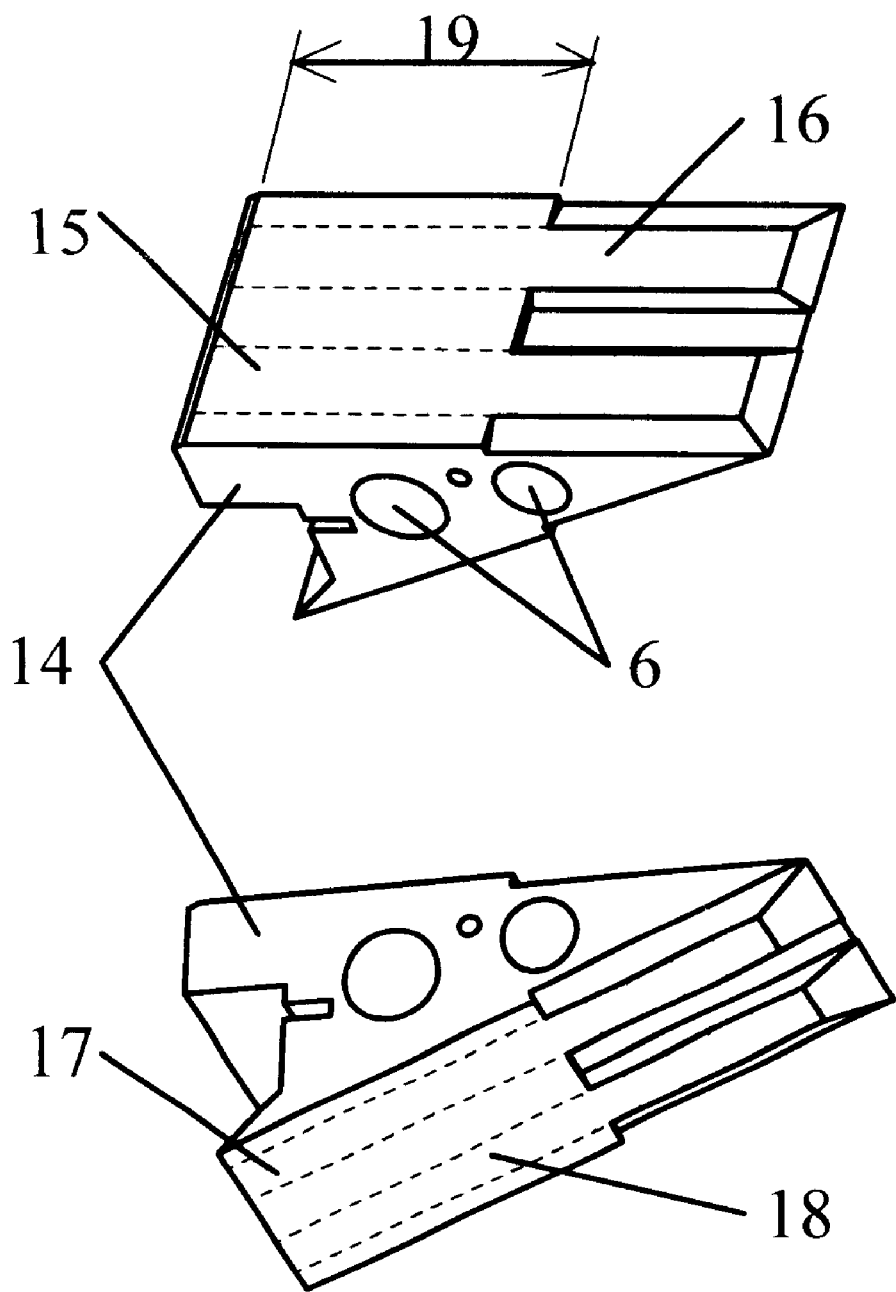
FIG. 3 depicts two views of a dual track heated wedge to make weld-tracks identical to those made by the wedge of FIG. 1 but configured with wider heating surfaces over a selected percentage of the total length of the heat-tracks.

FIG. 3 shows a heated wedge 14 with heat-tracks shown as shaded areas 15, 16, 17, and 18 which are identical to those shown on FIG. 1 labeled 2, 3, 4, and 5 respectively. The wedge 14 differs from the wedge 1 in FIG. 1 in that over the length 19 of wedge 14, the heating surface has been widened on either side of the heat-tracks. When sheet material is dragged over such a wedge, some sheet material on either side of the weld-tracks is subjected to wedge surface temperature for the time it takes to pass along the length 19. Since the length 19 is less than the total length of the heat-tracks 15, 16, 17, and 18, the material which passes over the hot surface of the wedge outside of the heat-tracks is heated to a temperature less than that of the heat-track material. This results in a less severe temperature gradient directly at the edge of the weld-track during the welding process. By varying the length 19 or tapering the edges of the additional wedge heating surface, virtually any desired edge temperature gradient can be designed into the wedge welding process.

Figure 4:
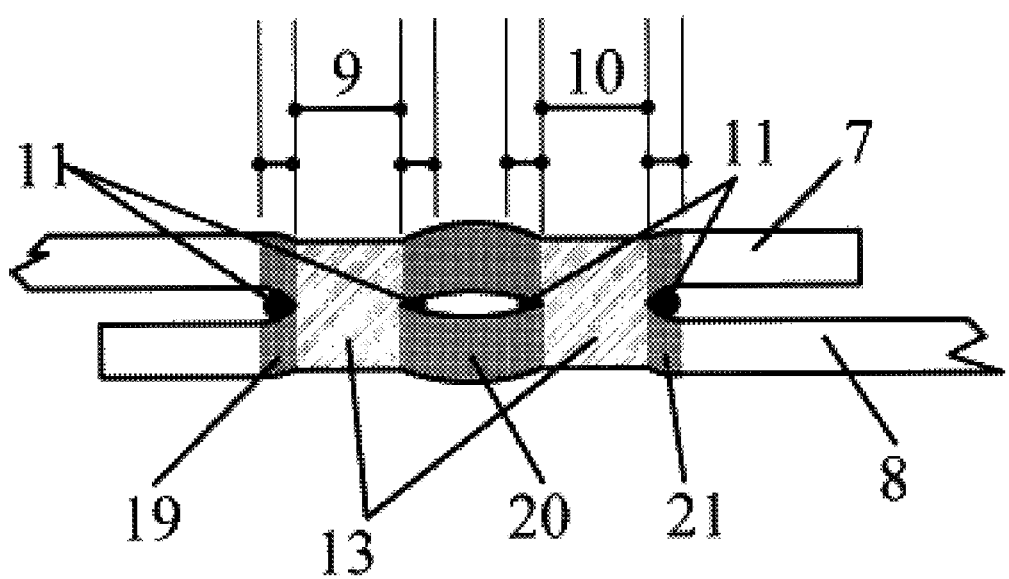
FIG. 4 depicts two sheets welded together using the heated wedge shown in FIG. 3.

FIG. 4 shows the cross-section of the weld-tracks created by the use of wedge 14, in FIG. 3. Item 7 is the upper sheet, which has been, welded to item 8 the lower sheet. The weld-track widths are shown as items 9 and 10. Items marked 11 are the beads of material squeezed out of the weld when the two sheet surfaces are pressed together after heating. The width of the weld-tracks 9 and 10 are the same as the widths of the heat-tracks 15 and 16 respectively, on wedge 14. The result is that the sheet material in the shaded areas marked 13 has been subjected to the high temperature of the heated wedge over the full length of the wedge. Some of the sheet material on either side of the weld-tracks shown as shaded areas 19, 20, and 21 in FIG. 4 has been in contact with the widened heated surface area of the wedge 14. This means that the sheet material along the edges of the weld-tracks has been subjected to a much less extreme temperature gradient over a much increased width of sheet. As a result the morphological changes in the macro-molecular and crystalline structure of the material along the edge of the weld-tracks is far less pronounced, stress concentrations are reduced and susceptibility to premature failure reduced.

An additional benefit of the type of wedge described by this invention is demonstrated when welding rough surfaced sheets. Some thermoplastic sheets used in the pollution control industry are configured with asperities on their surfaces for enhanced friction characteristics. Use of a heated wedge of the design in FIG. 3 for welding such sheets together has the additional benefit of melting down the asperities of the sheet material, at the sides of the weld-tracks, which pass over the additional heated wedge surface. This facilitates the effectiveness of the pinch rollers being able to squeeze the weld-tracks together without the asperities directly alongside the weld exerting a force tending to push the weld apart.

It is to be understood that the forms of the invention herein shown and described are to be taken as preferred examples of the same and that various changes in the shape, size, arrangement of parts, or materials used may be made without departing from the spirit of the invention or the scope of the claims.

I claim:

1. A heated wedge-shaped tool for welding together sheets of thermoplastic material, the tool comprising:

means for heating the wedge-shaped tool;

a plurality of weld tracks extending along the length of the wedge-shaped tool;

a region, having a length less than the length of the weld tracks, extending along a portion of the weld tracks where the heating surface has been widened on either side of the weld tracks;

whereby when sheet material is dragged over the wedge-shaped tool, some sheet material on either side of the weld-tracks is subjected to wedge surface temperature for the time it takes the sheet material to pass along said region.

* * * * *